United States Patent [19]

Roetling

[11] Patent Number: 5,343,309
[45] Date of Patent: Aug. 30, 1994

[54] IMAGE PROCESSING SYSTEM AND METHOD EMPLOYING ADAPTIVE FILTERING TO PROVIDE IMPROVED RECONSTRUCTION OF CONTINUOUS TONE IMAGES FROM HALFTONE IMAGES INCLUDING THOSE WITHOUT A SCREEN STRUCTURE

[75] Inventor: Paul G. Roetling, Ontario, N.Y.

[73] Assignee: Xerox Corporation, Stamford, Conn.

[21] Appl. No.: 928,388

[22] Filed: Aug. 12, 1992

[51] Int. Cl.⁵ .............................................. H04N 1/40
[52] U.S. Cl. .................................. 358/455; 358/456; 358/443; 358/465; 358/466; 358/447; 382/54
[58] Field of Search ................ 358/455, 456, 454, 463, 358/447, 448, 443, 462, 465, 466, 457–459; 382/54, 48, 50

[56] References Cited

U.S. PATENT DOCUMENTS

| | | | |
|---|---|---|---|
| 4,561,022 | 12/1985 | Bayer | 382/54 |
| 4,761,819 | 8/1988 | Denison et al. | 382/54 |
| 4,783,840 | 11/1988 | Song | 382/54 |
| 4,811,239 | 3/1989 | Tsao | 358/456 |
| 4,893,195 | 1/1990 | Tada et al. | 358/454 |
| 4,903,142 | 2/1990 | Hasebe et al. | 358/458 |
| 4,953,013 | 8/1990 | Tsuji et al. | 358/447 |
| 4,962,542 | 6/1990 | Klees | 358/463 |
| 5,038,388 | 8/1991 | Song | 382/54 |
| 5,091,967 | 2/1992 | Ohsawa | 358/458 |
| 5,166,810 | 11/1992 | Sorimachi et al. | 358/455 |
| 5,239,390 | 8/1993 | Tai | 358/458 |

Primary Examiner—Edward L. Coles, Sr.
Assistant Examiner—Fan Lee
Attorney, Agent, or Firm—Finnegan, Henderson, Farabow, Garrett & Dunner

[57] ABSTRACT

An image processing system is provided to convert halftone images to continuous tone images. It employs an adaptive filter which processes successive pixels in an input halftone image. The adaptive filter employs a filter that is selected under feedback control from a plurality of filter sets each having a plurality of filters. The halftone image is also low-pass filtered to generate a first approximation image (FAI). A spatial gradient value is computed for each pixel in the FAI. A control operates the adaptive filter to apply one of the predetermined filters to the current pixel as a function of the associated pixel spatial gradient. An output image from the adaptive filter in a first iteration of the filtering procedure can then be applied to the input of the adaptive filter for a second adaptive filtering iteration. Pixel gradients for the second iteration are computed from the image output from the first iteration. A predetermined number of iterations are performed and the image output from the last iteration is a continuous tone image for system output.

10 Claims, 7 Drawing Sheets

IMAGE PROCESSING SYSTEM AND METHOD EMPLOYING ADAPTIVE FILTERING TO PROVIDE IMPROVED RECONSTRUCTION OF CONTINUOUS TONE IMAGES FROM HALFTONE IMAGES INCLUDING THOSE WITHOUT A SCREEN STRUCTURE

CROSS-REFERENCE TO RELATED APPLICATIONS

Reference is made to the following concurrently filed patent application that is assigned to the present assignee and is hereby incorporated by reference:

U.S. Pat. No. 5,243,444, filed Mar. 25, 1992 and issued Sep. 3, 199, entitled IMAGE PROCESSING SYSTEM AND METHOD EMPLOYING SIGMA FILTERING TO PROVIDE IMPROVED RECONSTRUCTION OF CONTONE IMAGES FROM HALFTONE IMAGES INCLUDING THOSE WITHOUT A SCREEN STRUCTURE by Zhigang Fan.

BACKGROUND OF THE INVENTION

The present invention relates to image processing systems and methods having a capability for processing halftone images to retrieve continuous tone (contone) images and more particularly to systems and methods for converting halftone images without screen structure and other halftone images to contone images.

Contone images are converted to halftone or binary images to enable the production of printed copies. In binary form, the image has pixels which are either black or white and which are printed by applying ink or not applying ink. It is usually difficult to process a halftone image to achieve, for example, scaling, enhancement or contrast change. Often, moire or distortion is introduced when a halftone image is directly processed.

The halftone image can be photographed with high contrast film to sharpen it, but details are lost. Alternatively, an out-of-focus copy can be made of the halftone image to blur out the halftones, but the resultant image looks blurry. If the halftone image is rescreened at a different frequency, the rescreened image typically exhibits moire patterns.

Normally, therefore, the halftone image should be first reconverted to a contone image to remove the old halftone screen and enable image processing. Thereafter, the contone image may be reconverted to a halftone image for printing. However, the quality of prior art unscreening has been limited and had limited the quality of the reconverted halftone and subsequent prints.

Image processing systems used with printers in reprographic systems typically require a capability for converting halftone images to contone images to meet reconversion needs and for converting scanned halftone images to contone images that can then be processed by any of a large variety of enhancement algorithms commonly available for contone images.

The halftoning process loses some image information in the conversion of the original contone image to a halftone image. The reconversion of a halftone image to a contone image accordingly is essentially an estimation process since the halftoning process cannot be reversed exactly to reproduce a contone image identical to the original image.

One common process for converting contone images to halftone images is a process called ordered dithering. The majority of images currently processed in the printing industry are dithered images since most printers can only print binary images. Generally, ordered dithering is a process in which a scanned continuous signal from a contone image is converted to a series of black (1 or ink) or white (0 or no ink) pixels with the pixel values determined by the pattern of a threshold or dither matrix to which the scanned signal is compared.

Another process used to convert contone images to halftone images is called error diffusion. No special thresholding matrix is used in the error diffusion process. Instead, a single threshold is applied to the whole image. Generally, image pixels are processed sequentially, i.e., the first pixel is made either 1 or 0 according to whether its gray level is above or below a predetermined threshold value such as 0.5. The first pixel error is then carried forward and added to the gray value of the unprocessed surrounding pixels in determining whether these pixels are above or below the threshold value. The resultant errors are then carried forward, and the process is continued until the image is completely processed. Error diffused images normally can only be printed with very good control over individual printed pixels.

The classic prior art method for converting halftone images to contone images, i.e., for "unscreening" contone images from halftone images, applies a spatial low-pass filter to remove the screen from the halftone image. The low-pass filter method typically blurs image edges or at least loses fidelity of edge information (fine detail) as a result of the fact that such image detail has spatial frequencies higher than those of the halftone screen. Overall, the low-pass filter removes the halftone screen but leaves a blurred and apparently defocussed image.

U.S. Pat. No. 4,630,125 to Roetling, and assigned to the present assignee, discloses a method for reconstructing a contone image of grayscale values that had been converted to a halftone image of black and white spots with the use of a known screen. The reconstruction method involves isolation of each spot of a halftone image along with a neighborhood of surrounding spots, and, for each neighborhood, comparing a maximum screen pattern value producing a white spot with a minimum screen value producing a black spot.

If the minimum screen value giving a black spot is greater than the maximum screen value giving a white spot, then the grayscale pixel value of the isolated spot is the average of the maximum and minimum screen values Just described. If the minimum screen value giving a black spot is less than the maximum screen value giving a white spot, then the process is repeated after deleting that portion of the neighborhood of surrounding spots containing the maximum or minimum screen value furthest from the isolated spot. Use of the Roetling scheme is limited to orthographic or digitally created and stored dithered images since it is based on the regularity of dots in a halftone image created with a dither.

Another U.S. Pat. No. 4,841,377 issued to Hiratsuka et al. discloses a method for estimating an original contone image from a stored binary image. The method involves, inter alia, setting a plurality of scanning apertures in a binary image formed of a dither matrix, selecting one scanning aperture satisfying a predetermined condition for each picture element of a continuous image to be estimated, and estimating the continuous image on the basis of the number of white or black picture elements in the scanning aperture selected. The Hiratsuka method is similarly limited to dithered halftone images.

More recently, U.S. Pat. No. 5,027,078, issued to Z. Fan, discloses a method for converting halftone images to contone images. The Fan method includes ways to estimate an improvement over the Roetling method through the application of "logic filtering." The logic-filter method provides best results for dithered halftone images that are scanned with high resolution, but it is also limited to dithered halftone images with a known or unknown but estimated screen, Additional prior art that has limited relevance to the present invention follows:

1. U.S. Pat. No. 4,761,819, ADAPTIVE NOISE REDUCTION FILTER FOR RECONSTRUCTED IMAGES, dated Aug. 2, 1988, filed by Kenneth S. Denison, et al.

2. U.S. Pat. No 4,783,840, METHOD FOR ENHANCING IMAGE DATA BY NOISE REDUCTION OR SHARPENING, dated Nov. 8, 1988, filed by Woo-jin Song.

3. U.S. Pat. No. 5,038,388, METHOD FOR ADAPTIVELY SHARPENING ELECTRONIC IMAGES, dated Aug. 6, 1991, filed by Woo-Jin Song.

4. U.S. Pat. No. 4,811,239, "Digital Facsimile/Image Producing Apparatus", dated Mar. 7, 1989, filed by Sherman H. M. Tsao.

5. U.S. Pat. No. 4,561,239, IMAGE PROCESSING METHOD BASED ON PROCESSING OF INTER-RELATED IMAGE GRADIENTS, dated Dec. 24, 1985; filed by Bryce E. Bayer.

In summary, the prior art generally has had shortcomings in preserving edge smoothing and avoiding edge blurring in the "unscreening" of contone images from halftone images. Further, the prior art generally has had no effective capability for converting halftone images created by error diffusion to contone images.

SUMMARY OF THE INVENTION

An object of the present invention is an improved image processing system employing adaptive filtering to convert a halftone image to a continuous tone image with better edge smoothing and reduced edge blurring.

To achieve this and other objects, an image processing system for converting halftone images to continuous tone images comprises means for sequentialy generating value data for successive pixels of a halftone image and means for adaptively filtering each of the pixels in accordance with a filter selected from a plurality of predetermined filters.

Means are provided for low-pass filtering the halftone image pixels to generate a first approximation image (FAI) and for generating a spatial gradient value for each pixel in the FAI. Means are provided for controlling the adaptive filter means to apply one of the predetermined filters to the current pixel as a function of the associated pixel spatial gradient from the spatial gradient generating means. Means are provided for generating an output continuous tone image containing the adaptively filtered pixels for storage and/or processing to a halftone copy or print.

BRIEF DESCRIPTION OF THE DRAWINGS

The accompanying drawings, which are incorporated in and constitute a part of this specification, illustrate one embodiment of the invention and together with the description provide an explanation of the objects, advantages, and principles of the invention. In the drawings.

DESCRIPTION OF THE PREFERRED EMBODIMENT

Figure 1:
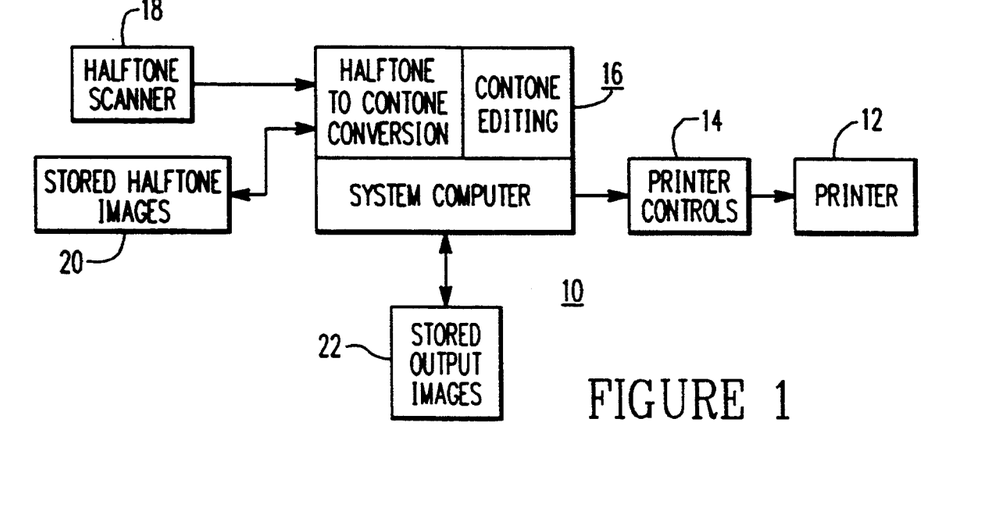
FIG. 1 shows a reprographic system in which the present invention is applied.

An image processing system 10 shown in FIG. 1 includes a conventional printer 12 that is operated in accordance with the invention by printer controls 14 under the control of a system computer 16. Input halftone images are obtained from a scanner 18 or from a first memory 20. The system computer 16 is programmed to convert the halftone images to continuous tone images and to edit the continuous tone images as desired for subsequent printing. For example, the continuous tone images may be magnified or scaled or edited for tone reproduction.

Another memory 22 is used to store contone images that have been converted from halftone images and edited as desired. When a stored contone image is to be printed, it is retrieved from storage and halftoned for printing through the printing controls 14.

In accordance with the invention, scanned black and white images are first converted or "unscreened" to contone images, and thereafter edited as desired and reconverted to halftone images for print processing. Halftone images int he memory 20 are stored for subsequent conversion and processing in accordance with the present invention.

The scanned or stored input images may be error-diffused or other images with no screen structure or they may be dithered images with a screen structure.

There are various applications in which it is desirable to convert halftone images to contone images. In the preferred image processing embodiment, image conversion from halftone to contone is performed to enable high quality printing substantially free of distortion.

In all such image conversion applications, the traditional low-pass filtering approach has been characterized with blurred edges, loss of fine detail and a defocussed appearance. Other converting techniques have provided some improvement as described hereinabove, but no known techniques have had a capability for high quality edge smoothing, especially in the conversion of error-diffused images and low-resolution scanned images.

In accordance with the present invention, the image processing system 10 incorporates an adaptive filter algorithm to provide improved halftone-to-contone image conversion relatively simply with improved edge-preserving smoothing. Image conversion is preferably implemented with an adaptive filter procedure, with the filter structure controlled by an adapting function based on spatial gradient data. Since the adaptive filter procedure essentially requires little information about screen properties of an image being converted, it is also suitable for use with halftone images with no screen structure, i.e., error-diffused halftone images or low-resolution halftone images. In the description that follows, halftones have pixel values of 0 and 1, and gray images have pixel values in the range of 0 to 1.

An approximate idea of the halftone pattern frequency can be determined by measuring as the first peak in the autocorrelation function of the image, as suggested by Stoffel, in a book (Ch. 6.1) entitled "Graphical and Binary Image Processing and Applications" edited by James Stoffel, published by Artech House, 1982, or as the lowest non-zero spatial frequency peak in the Fourier transform of the image, as suggested by Allebach. Alternatively, it may simply be estimated to be where it normally is in practice, namely at about one quarter to one half the resolution limit of the eye for the conditions of viewing for which the image was designed (about 2.5 to 5 dots/mm for a printed page).

Once an estimate of the dominant spatial frequency of the halftone has been made by any of the above methods, the adaptive filtering process can be started. In the system and method described herein, an iterative process is preferably used to obtain successively better approximations of the underlying contone image by using each approximation to derive the adapting information for the next iteration.

The process is started by performing a low-pass spatial filtering on the halftone image. The low-pass filter is designed to cut off spatial frequencies at or above the dominant halftone frequency. With a known periodic screen, the filter should remove the fundamental and the harmonics of the screen frequency. The output of the low-pass filter is a contone image, herein called a first approximation image (FAI), having the correct image content at spatial frequencies below the halftone frequency, but missing the higher frequency information.

The next step in the preferred procedure is to apply an adapting function. A representation of the rate of change of the gray level and the direction of the change of the FAI is determined to operate as a basis for adaptive filter control. The term "spatial gradient" is used herein to refer generally to such a representation and accordingly embraces special and other mathematical functions that define directional rate of change of gray level.

The original halftone image is filtered with an adaptive spatial filter. The spatial gradient information controls the adaptation of the filter, namely, for each pixel point, the spatial filter is adjusted to a lower frequency cutoff (that is, the filter is broadened) in the direction of minimum spatial gradient and the filter is adjusted to a higher spatial frequency cutoff (the filter is narrowed) in the direction of the maximum spatial gradient. The ratio of the frequency cutoffs (the filter widths) is controlled by the ratio of the spatial gradient magnitudes. The average response (the area of the filter) remains approximately the same as that for the original low-pass filter. In this manner, the adaptation of the filter preserves more detail in the second approximation image (SAI) in the direction of local detail in the FAI, while still removing the halftone pattern by averaging over more area in the direction of less local detail in the FAI. Thus, the SAI is a better approximation of the correct contone image than the FAI, especially in maintaining a better, sharper reproduction of edges.

The original halftone image is repeatedly filtered as often as desired to refine the adapting function and therefore the resulting contone image. In the next iteration, the SAI is used to derive the gradient function instead of the FAI, and the original halftone image is filtered under adaptive control of the SAI derived gradient functions. The current best approximation is always used for input to the adaptive control in the next iteration.

PROGRAMMED COMPUTER PROCEDURE FOR HALFTONE IMAGE UNSCREENING BY ITERATIVE ADAPTIVE FILTERING

A programmed procedure 30 (FIGS. 2 and 3) illustrates the manner in which the present invention is implemented in the preferred embodiment. After entry to the procedure 30, pixel data is obtained in a block 32 for the halftone image to be unscreened to a contone image. Pixel data is processed across each pixel row and from row-to-row until the entire image is completed.

Figure 2:
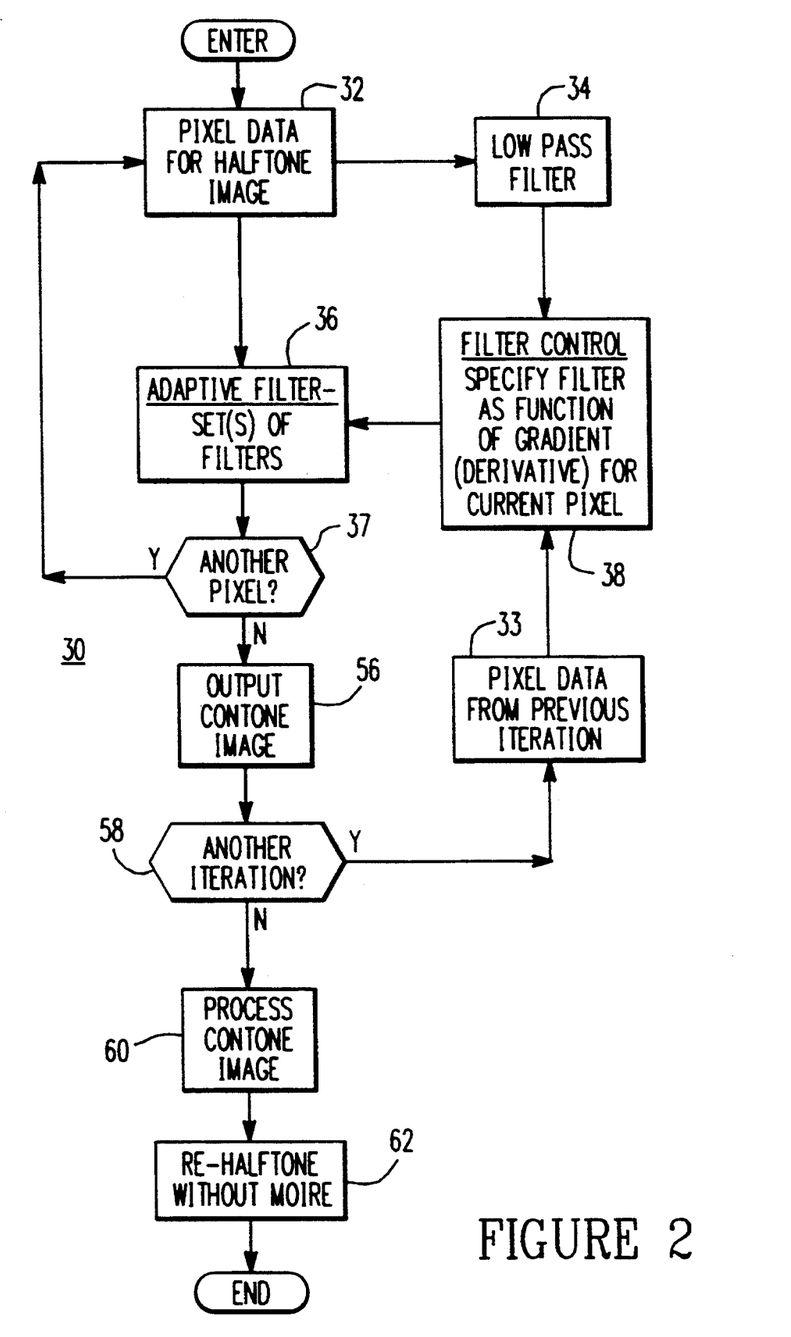
FIG. 2 shows a flow chart for an adaptive low-pass filter procedure structured in accordance with the present invention.

As previously indicated, all pixels are first processed through a typical low-pass filter in a block 34 to develop a first approximation image (FAI). Essentially, the resultant image is a coarse approximation of the true contone image that underlies the halftone image in the sense that approximate gray levels are determined for larger image areas with poor representation of edges within the image. Nonetheless, spatial halftone frequencies originally used to create the halftone image are removed.

Pixels in the halftone image are next sequentially processed by an adaptive filter in a block 36. The adaptive filter is provided with one or more sets of preselected filters. The functioning of the adaptive filter is "adaptive" in the sense that the particular filter used for each processed pixel is selected under feedback control based on the content of the FAI in the block 34.

More particularly, a block 38 generates the feedback filter control applied to the adaptive filter 36. Generally, the filter selection is made as a function of the spatial gradient for the current pixel in the FAI. The spatial gradient for each pixel is a vector or directional first derivative that defines the rate and direction of change in gray for that pixel.

The gradient is specified in terms of a number of directions, i.e., at least horizontal, vertical, and both diagonals in the preferred embodiment. Filter selection is based on the vector magnitude as shown in greater detail in FIG. 3.

Figure 3:
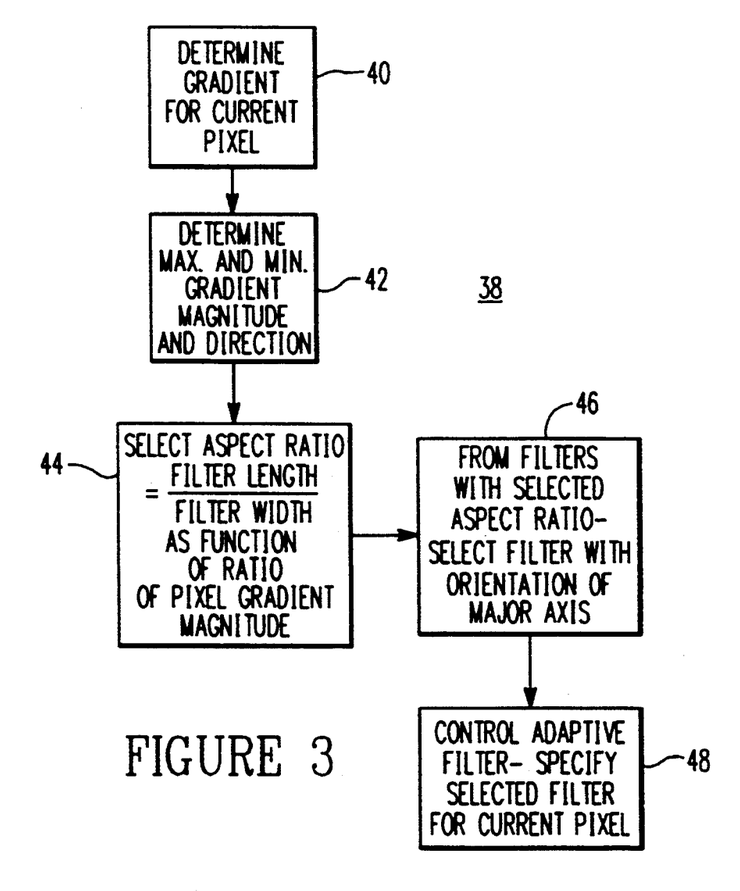
FIG. 3 illustrate a routine employed in the procedure of FIG. 2 to provide filter selection control as a function of pixel gradient.

Once the spatial gradient is determined for the current pixel by a block 40, the gradient magnitude is determined in a block 42. In a block 44, an aspect ratio is selected for the current pixel as a function of gradient magnitudes. The aspect ratio is defined as the ratio of the filter length to the filter width.

As previously indicated, the ratio of the filter length to width is based on the ratio of the gradient magnitude in the direction of greatest gradient magnitude to the gradient magnitude in the direction of minimum gradient magnitude. The minimum gradient magnitude represents the direction of least local detail, and the filter is broadened in this direction to provide averaging over a larger area for removal of the halftone pattern. The maximum gradient magnitude represents the direction of most local detail, and the filter is narrowed in this direction to provide reduced area averaging that preserves edge detail. Thus, with increasing gradients, the filter becomes longer in the direction transverse to the gradient and it becomes narrower in the direction of the gradient.

For larger gradients, a filter having a higher aspect ratio is selected for application in the block 36 (FIG. 2). The minor axis of the filter is then directed in the approximate direction of the larger gradient (as determined by the block 42) to preserve edge detail as just described.

Figure 4A:
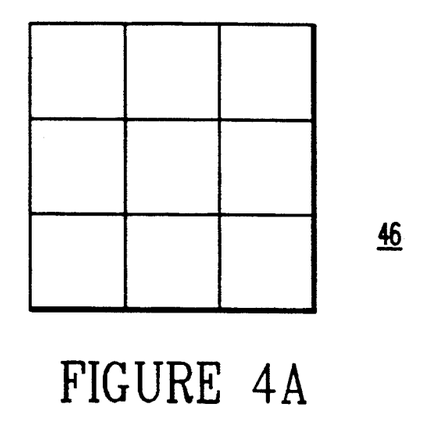
FIGS. 4A–4E show various filters that can be used in the procedure of FIG. 2.
Figure 4B:
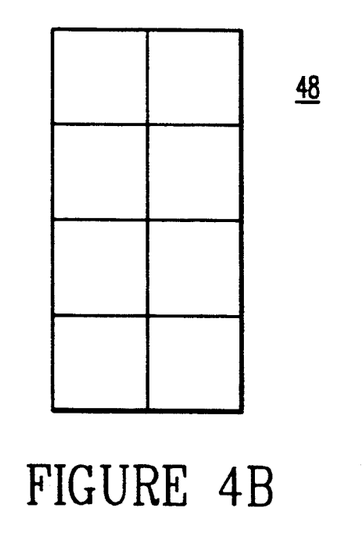
Figure 4C:
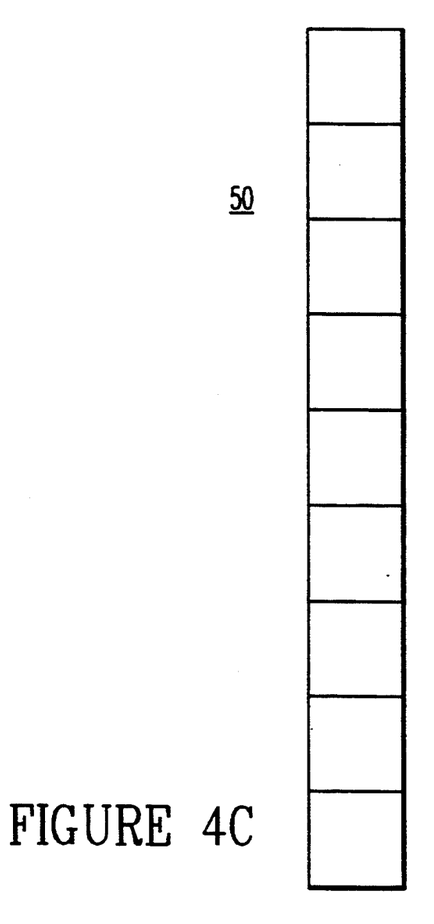

In FIGS. 4A–4C, there are shown three filters which belong to an exemplary set of preselectable filters for application to the horizontal direction. A filter 46 is a symmetric filter for use with pixels having small gradients in all directions. A filter 48 is used for medium gradients in the horizontal direction, and a filter 50 applies to large gradients in the horizontal direction. Filter sets (not shown) similar to the filters 46, 48, and 50 can be used for the vertical and diagonal directions in the present embodiment or for any other direction(s) employed in other embodiments.

Figure 4D:
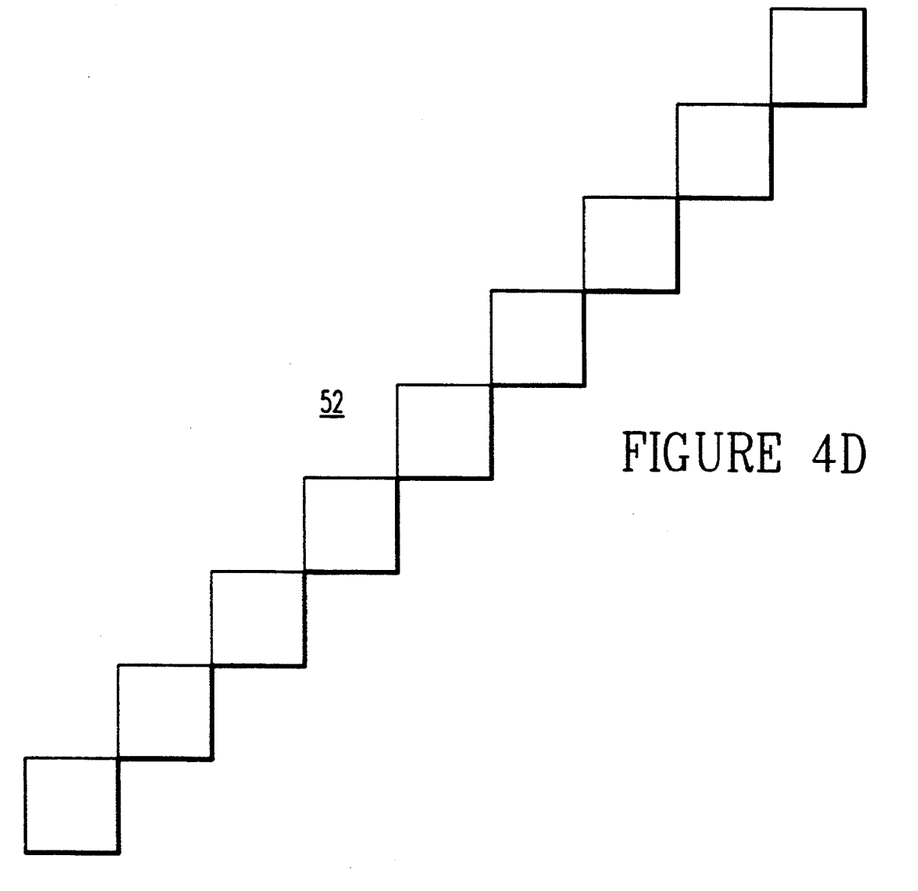
Figure 4E:
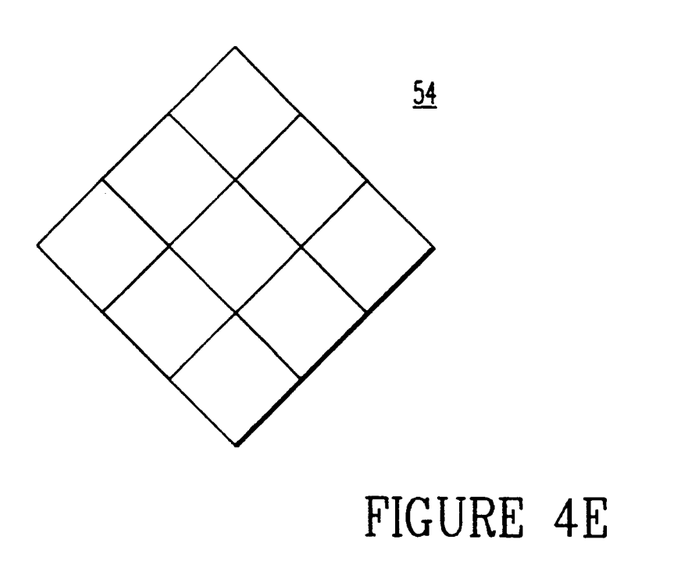

In FIG. 4D, an exemplary diagonal filter is shown for large gradients in the diagonal direction. A diamond filter outline is shown in FIG. 4E for use with 45 DEGREE halftones. In black and white images, the 45° halftone hides the dot pattern from normal human vision which is a result of learned responses which perceive vertical/horizontal patterns best. Multiple filter sets are preferably preselected for use in the image processing system, and the operator selects the filter set to be used for the image being processed on the basis of the spatial dot frequency and direction. For example, the dot frequency commonly used in black and white newspapers and magazines is in the range of 85 to 120 dots per inch with a 45 DEGREE direction.

If the image is scanned at 600 spi, a symmetric 7×7 diamond filter can be used with an 85 dot per inch frequency, a symmetric 6×6 diamond filter can be used for a 100 dot per inch frequency, and a symmetric 5×5 filter can be used for a 120 dot per inch frequency. The symmetric filter provides the basic filter size for the filter set to which it belongs, With reference again to FIG. 3, after the aspect ratio is selected in the block 44, a filter having the selected aspect ratio is selected in a block 46 from the various directional sets of filters so that the filter major and minor axes line up with the respective directions of minimum and maximum gradient. Finally, a block 48 executes adaptive control on the adaptive filter block 36 in FIG. 2 by specifying use of the selected filter for the current pixel. In effect, adaptive control is implemented by changing the filter shape from pixel to pixel under spatial derivative (gradient) control.

In the relatively infrequent cases where the gradient is large in more than one direction, the area of the selected filter is effectively reduced to reduce the number of pixels being averaged. If averaging occurs over too few pixels in these circumstances, the output becomes noisy, but overall the output contone image is still significantly improved over the prior art.

In the procedure 30 in FIG. 2, the block 36 then applies the selected filter to the current pixel, i.e., averaging calculations are performed to generate a new filtered value for the current pixel. The programmed procedure 30 then flows to a test block 37 which makes a return to the block 32 to initiate processing of the next pixel in the image. The process just described is repeated until all pixels in the image are processed to form an output contone image, namely, a bank of pixel data called a second approximation of the image (SAI), as indicated by a block 56.

Next, a test block 58 determines whether another iteration is to be performed according to an operator preselection of total iterations. If another iteration is to be performed, the SAI pixel data is used to determine pixel gradients, and the original halftone image is processed through the adaptive filter block 36 under adaptive feedback control in a manner like that previously described until a third approximate image (TAI) is produced in the block 56.

The iterative procedure is continued until the iteration count equals the preset value in the test block 58. Nominally, little image improvement is realized after the second iteration so that a preset value of two iterations would typically be employed.

The final output contone image is one that results from a relatively simply built programmed procedure, yet it represents substantial improvement over the prior art especially from the standpoint of avoidance of edge blurring and preservation of fine detail. Further, the procedure is relatively insensitive to the screen structure and is adaptable to use with color images.

As indicated by a block 60, the final output contone image can be processed as desired to enhance it, change its contrast, etc. With or without post conversion processing, the final output image can be re-halftoned for printing without moire or other distortion as indicated by a block 62.

Figure 5A:
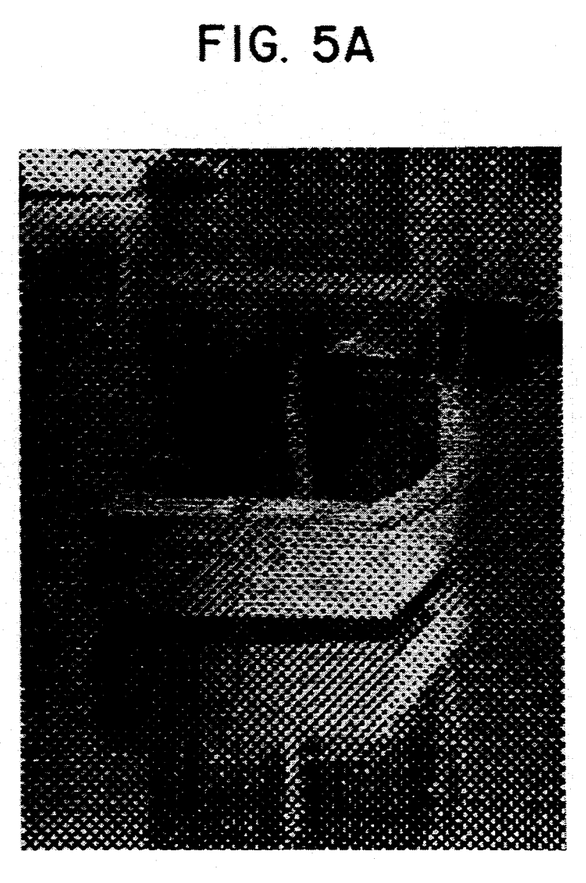
FIG. 5A shows a halftoned original for which a repetitive screen was used, but error diffusion or a random screen could also have been used.
Figure 5B:
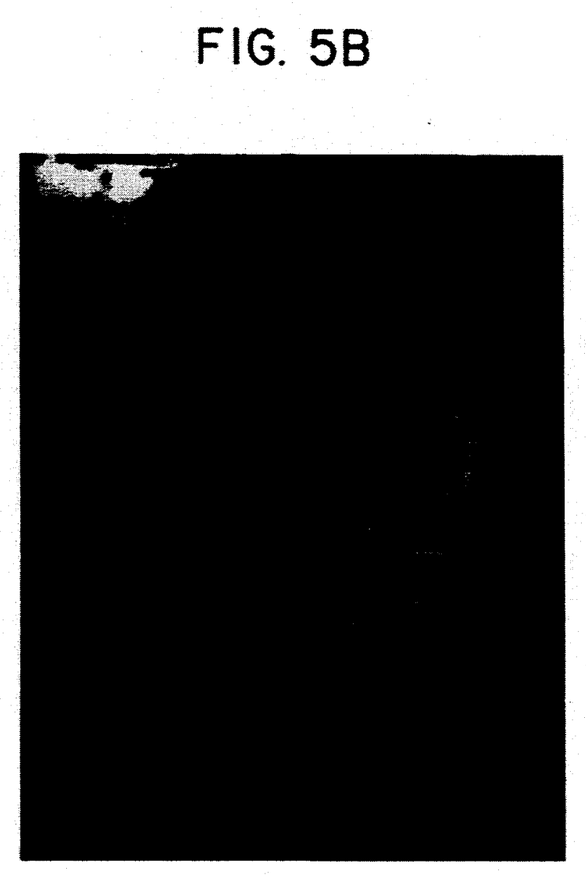
FIG. 5B is a continuous tone output image which was generated from the original image of FIG. 5A by low-pass filtering to remove the halftone pattern.
Figure 5C:
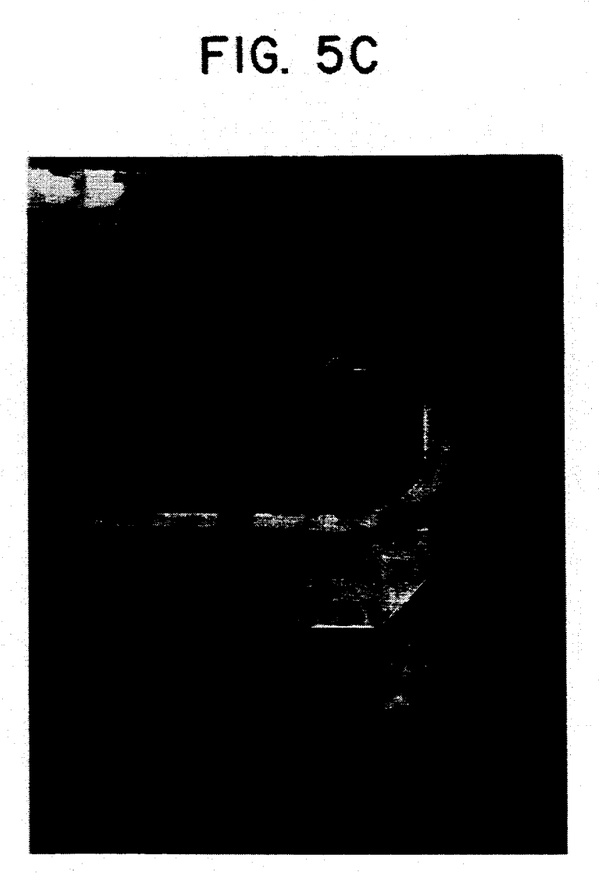
FIG. 5C is a continuous tone output which was generated from the original image of FIG. 5A in accordance with the present invention; the smooth areas of FIG. 5C are much less noisy than those of FIG. 5B, yet the edges of the image of FIG. 5C are considerably sharper than those of the image of FIG. 5B.

FIGS. 5A–5C present images that illustrate improvements provided by the invention. The filter for the continuous tone image generated from the image of FIG. 5A in accordance with the prior art (FIG. 5B) was chosen to keep the image as sharp as possible, while still removing the halftone pattern. Therefore, the image is somewhat noisy. More severe filtering could smooth the noise, but would further blur the edges. As illustrated in FIG. 5C, the iterative, adaptive filtering of the present invention allows for more severe smoothing in areas of low detail, while the adaptation keeps the edges sharp.

APPENDIX

Images are shown on the following three pages to illustrate comparatively the results achieved with use of the present invention.

FIG. 5A shows a halftoned for which a repetitive screen was used, but error diffusion or a random screen could also have been used;

FIG. 5B is a continuous-tone output image which was generated from the original image of FIG. 5A by low-pass filtering to remove the halftone pattern;

FIG. 5C is a continuous-tone output image which was generated from the original image of FIG. 5A in accordance with the present invention. Note that the smooth areas of FIG. 5C are much less noisy than those of FIG. 5B, yet the edges of the images of FIG. 5C are considerably sharper than those of the images of FIG. as illustrated in FIG. 5C, the adaptive filtering of the present invention allows for more severe smoothing in areas of low detail, while the adaptation keeps the edges sharp.

The foregoing description of the preferred embodiment of the invention has been presented for purposes of illustration and description. The description is not intended to be exhaustive or to limit the invention to the precise form disclosed, and modifications and variations of the invention may be made in light of the above disclosure or may be developed from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image processing system for converting halftone images to continuous tone images, said system comprising:
   means for sequentially generating value data for successive pixels of a halftone image;
   means for sequentially and adaptively filtering each of the pixels in accordance with a filter selected from a plurality of predetermined filters;
   means for low-pass filtering the halftone image pixels to generate a first approximation image (FAI);
   means for generating a spatial gradient value for each pixel in the FAI;
   means for controlling said adaptive filter means to apply one of said predetermined filters to each pixel as a function of the associated pixel spatial gradient from said spatial gradient generating means; and
   means for generating an output continuous tone image containing the adaptively filtered pixels.

2. The image processing system of claim 1, wherein said adaptive filter means includes multiple sets of filters with the filter sets having different orientations corresponding to different pixel gradient directions, the filters of each of said filter sets being structured with different aspect ratios and oriented for an assigned one of said gradient directions.

3. The image processing system of claim 2, wherein the plurality of predetermined filters and the selected filter are determined as a function of the pixel gradient direction and magnitude.

4. The image processing system of claim 3, wherein the filter aspect ratio is determined as a function of the magnitude of the pixel gradient.

5. The image processing system of claim 4, wherein an aspect ratio is first selected with the aspect ratio increasing with increasing pixel gradient magnitudes, the filter set is determined in accordance with the pixel gradient direction, and the selected filter within the selected filter set is determined in accordance with the selected aspect ratio.

6. The image processing system of claim 2, wherein at least one of the filters in each of said filter sets is a symmetric filter for use over substantially uniform image areas.

7. The image processing system of claim 2, wherein each of said filter sets includes at least one asymmetric filter having a major axis for alignment with a direction transverse to the pixel gradient direction and a minor axis for alignment with the pixel gradient direction.

8. The image processing system of claim 2, wherein a predetermined number of adaptive filtering iterations are performed and wherein means are provided for applying the input halftone image data in each iteration after the first iteration to the input of said adaptive filter means, and means are provided for applying the output image data from said adaptive filter means in each iteration to the input of said spatial gradient generating means for determination of pixel gradients for adaptive control of filter selections in the next iteration.

9. A method of converting halftone images to continuous tone images, the steps of the method comprising:
   sequentially generating value data for successive pixels of a halftone image;
   successively and sequentially and adaptively filtering each of the pixels in accordance with a filter selected from a plurality of predetermined filters;
   low-pass filtering the halftone image pixels to generate a first approximation image (FAI);
   generating a spatial gradient value for each pixel in the FAI;
   controlling the adaptive filtering step to apply one of the predetermined filters to each pixel as a function of the associated pixel spatial gradient; and
   generating an output continuous tone image containing the adaptively filtered pixels for storage and processing to a halftone copy or print.

10. The method of claim 9, wherein the steps further include performing a predetermined number of adaptive filtering iterations and applying the input halftone image data in each iteration after the first iteration to the input of the adaptive filtering step, and applying the output image data from the adaptive filtering steps in each iteration to the input of the spatial gradient generating step for determination of pixel gradients for adaptive control of filter selections in the next iteration.

* * * * *